United States Patent [19]

Mancosu et al.

[11] Patent Number: 5,811,672

[45] Date of Patent: Sep. 22, 1998

[54] METHOD OF CONTROL TO DETERMINE THE COMFORT LEVEL OF A TIRE OF A WHEEL FOR A VEHICLE

[75] Inventors: Federico Mancosu, Milan; Giuseppe Matrascia, Seregno, both of Italy

[73] Assignee: Pirelli Coordinamento Pneumatici S.p.A., Milan, Italy

[21] Appl. No.: 752,259

[22] Filed: Nov. 18, 1996

[30] Foreign Application Priority Data

Nov. 21, 1995 [IT] Italy .................................. MI95A2399

[51] Int. Cl.$^6$ ............................ E01C 23/00; G01M 17/02
[52] U.S. Cl. .............................................................. 73/146
[58] Field of Search ............................ 73/146, 462, 459; 364/506, 508

[56] References Cited

U.S. PATENT DOCUMENTS 4,817,421   4/1989   Himmler .

FOREIGN PATENT DOCUMENTS 3614379   11/1987   Germany .

OTHER PUBLICATIONS

Proceedings of the 1992 American Control Conference vol. 1, 24–26 Jun. 1992, pp. 526–530, L.R., Ray "Nonlinear Estimation of Vehicle State and Tire Forces".

P.W.A. Zegelaar et al, "Tyre Models for the Study of In–Plane Dynamics" *The Dynamics of Vehicle on Roads and on Tracks, Supplement to Vehicle System Dynamics*, vol. 23, pp. 578–590 (1994). No month.

R.S. Sharp et al, "The Influence of Structural Flexibilities on the Straight–running Stability of Motorcycles" *Vehicle Systems Dynamics 9*, pp. 327–357 (1980). No month.

David A. Sacrist et al, "A Simulation of Vehicle and Tire Dynamics," pp. 139–146, 1974 Joint Automatic Control Conference (1974). No month.

O.P. Agrawal et al, "A Superelement Model Based Parallel Algorithm for Vehicle Dynamics" *Computer &Structures*, vol. 51, No. 4, pp. 411–423 (1994). No month.

*Primary Examiner*—William L. Oen
*Attorney, Agent, or Firm*—Watson Cole, Stevens Davis, P.L.L.C.

[57] ABSTRACT

A method of control to determine the comfort level of a tire of a wheel for a vehicle is based on a dynamic tire model with a rigid ring having concentrated parameters that represent construction characteristics of the tire. Some concentrated parameters are measured, others are determined by parametric identification through a test of passing over an obstacle of the tire. From testing eight curves of natural frequencies and dampenings are obtained that are compared with as many calculated curves obtained from the model. By checking the coincidence between the eight calculated curves and the eight experimental curves, the values of the other concentrated parameters are determined that cause the calculated frequencies and dampenings to coincide with the experimental ones. The values of the concentrated parameters obtained in this way are compared with ranges of values of dampenings and stiffness corresponding to pre-established indices of comfort, so as to approve those tires wherein the concentrated parameters fall within predetermined intervals.

11 Claims, 8 Drawing Sheets

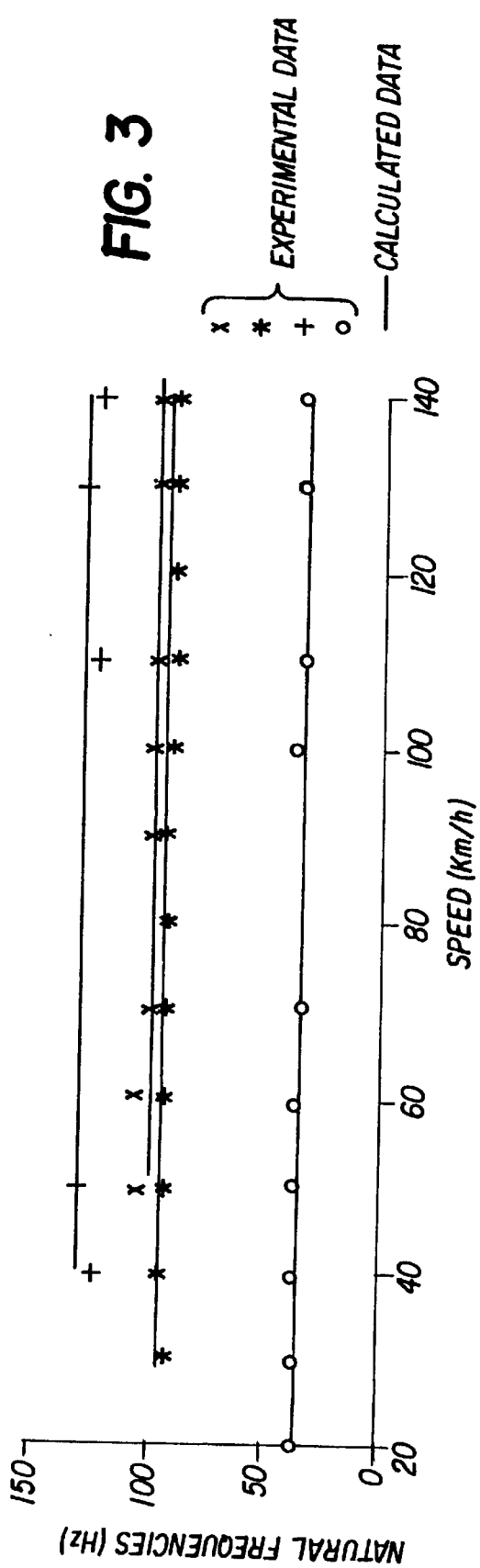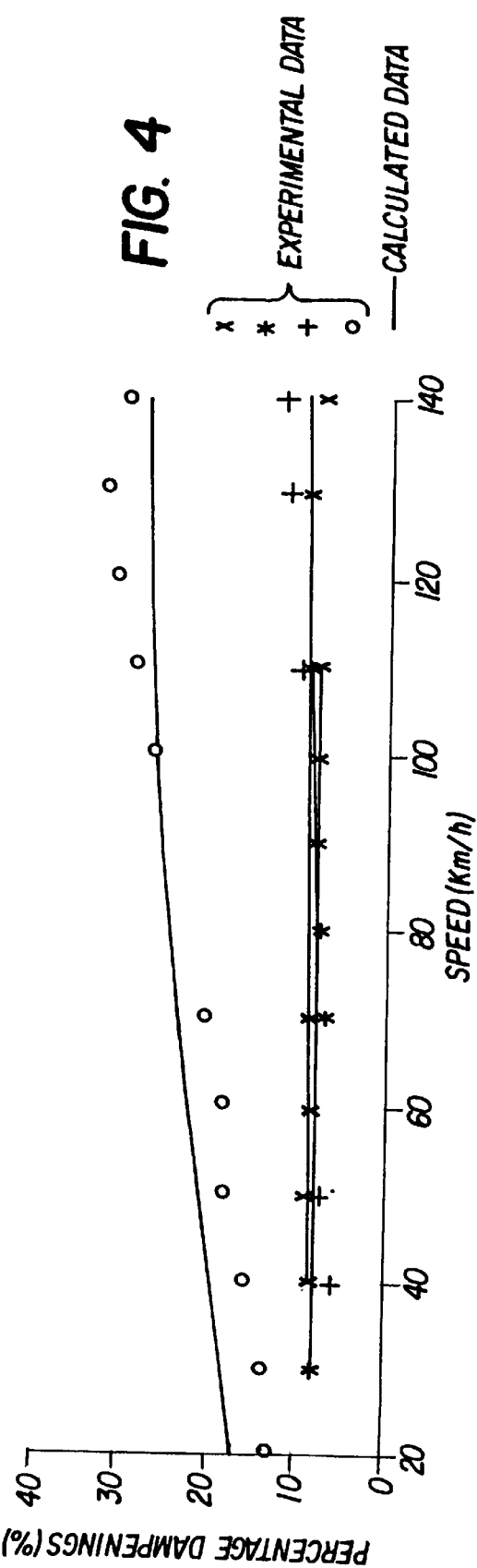

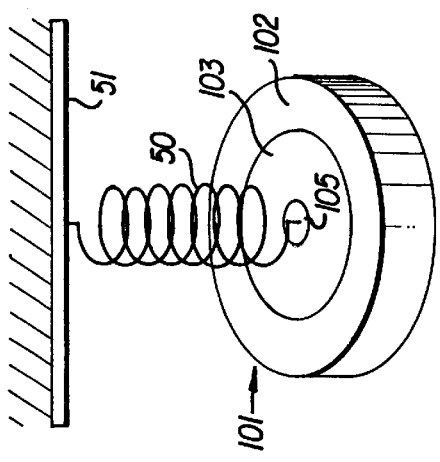
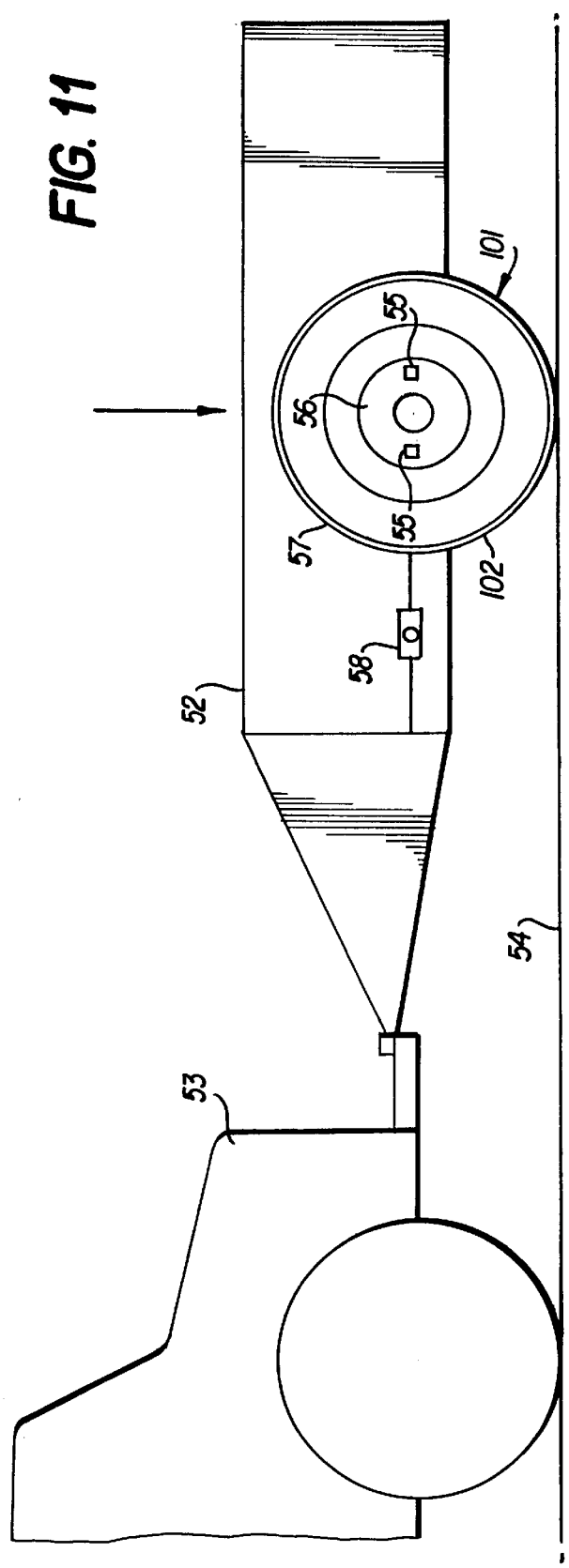

METHOD OF CONTROL TO DETERMINE THE COMFORT LEVEL OF A TIRE OF A WHEEL FOR A VEHICLE

FIELD OF THE INVENTION

The present invention relates to a method of control to determine the comfort level of a tire of a wheel for a vehicle.

DISCUSSION OF BACKGROUND

The tire is the element through which road and vehicle exchange forces; the interest, however, is all for the forces that are transmitted by the road to the vehicle, because these influence the ride comfort of the passengers.

If a structure is infinitely rigid, forces are transmitted directly, without any attenuation; but if the structure is elastic and provided with dampenings, structural or concentrated, the forces transmitted can be attenuated, or on the other hand amplified, due to the effect of resonances. The tire is a viscoelastic body and, like all viscoelastic bodies, it vibrates when it is excited (by forces or by deformations). It is therefore possible to say that the vibrations felt by the passengers inside a vehicle, are influenced or generated by the tire.

In vehicles an attempt is therefore made to attenuate as much as possible the forces transmitted by the road or by the engine and this means reducing the vibrations generated during the operation of the vehicle. In order to attenuate these vibrations, either the suspensions of the vehicle are optimised (this is done today in the vertical direction), or the comfort performance of the tire is optimised (especially in the longitudinal and lateral direction). The problem is not simple to solve because a tire that has been optimised as to comfort is not necessarily so for all the other aspects required of the tire, such as driveability, safety, wear, etc. Frequently therefore, depending on the vehicle the manufacturer of the vehicle selects the tire that is a correct compromise among all the required performances so that he will request from the manufacturer of the tire a product that comes as close as possible to his requirements. If a vehicle has highlighted phenomena of vibrations in the lateral direction, a tire will be required that optimises comfort in that direction, even if something is lost in road-holding.

The analysis of the vibratory phenomena of a vehicle is, thus, important for anyone wishing to optimise its ride comfort through the tires.

To this day, this analysis is carried out through some experimental tests and through simulations with mathematical and physical models of tire+vehicle+road excitation. In general, the known models have two main objectives: analysis of the physical phenomenon under examination and prediction of the experimental results so as to reduce to a minimum the experimental tests that require a great deal of time and expensive equipment.

For the manufacturers of tires the models that are interesting are not only those of the tire but also those of the vehicle and of the road excitation. This makes the task of the tire designer considerably complex and urges him to look for comfort indicators that simplify or synthesise the behavior of the tire on the vehicle. Indices of comfort of a vehicle, from the point of view of the tire, can be the forces at the hub of the wheel of the vehicle, in the sense that the lower are the amplitudes of the forces transmitted to the hub by the tire, the greater is the comfort of the vehicle. This principle, however, is not absolute but is relative to the vehicle; in other words, if a tire generates large forces at the hub of a vehicle, not necessarily does the same tire generate large forces at the hub of another vehicle, and vice versa. The explanation of this is due to the fact that the tire, which is already a complex dynamic system, is inserted in another even more complex system, such as the vehicle; thus, the dynamic phenomena of the two systems, vehicle and tire, interact one with the other.

P. W. A. Zegelaar et al. in "Tyre Models for the Study of In-Plane Dynamics", the Dynamics of Vehicle on Roads and on Tracks, Supplement to Vehicle System Dynamics, Volume 23, 1994" describe a dynamic tire model in the plane. The tire, in a range of frequencies from 0 to 130 Hz, is approximated by a model consisting in a rigid ring that represents the tread strip, a disc that represents the assembly rim and the portion of tire consisting of the bead and radial and tangential springs, distributed circumferentially, that connect the rigid ring to the disc and represent the sidewall of the tire and the air under pressure inside the tire. The model also comprises additional springs (residual stiffnesses) that take into account deformations in the contact area between tire and road and a brush model that takes into account the slipping under the contact area.

The known model considers that the wheel has four degrees of freedom, two translatory x and z, in a longitudinal and in a vertical direction, and two rotatory theta ($\theta 1$ and $\theta 2$) round a transversal axis y. Moreover, it hypothesises that the variations in the speed of rotation of the wheel are small so that the equations of motion of the model can be linearised. The four degrees of freedom of the wheel allow the application of the model to the study of the ability to transmit the vibrations of the tire in a longitudinal direction x and in a vertical direction z and in a rotatory direction theta. From the equations of motion of the ring model a transfer matrix is obtained that describes the input-output relation between displacements and forces. Analyzing some transfer functions under different conditions the main modes in which the tire vibrates are identified by calculation.

In order to determine the (overall) concentrated parameters of the known model that correspond to a tire under examination, a modal analysis technique and a direct measurement technique of the physical properties are used.

The modal analysis technique is very expensive, while the direct measurement technique is used to take measurements of a static type on the tire. This brings about a difference between the values of the calculated natural frequencies and those of the experimental frequencies, as observed by the authors themselves. Thus, this dynamic tire model gives results, in terms of natural frequencies, that do not correspond to those measured experimentally.

SUMMARY OF THE INVENTION

The object of the present invention is a method of control of a tire design based on a dynamic tire model in a plane that takes into account the variations of the physical properties of the tire with the forward speed, so as to correspond with a large approximation with the experimental results, and that allows an analysis to be made of the vibratory phenomena, transmitted or generated by the tire, that influence the ride comfort of a vehicle.

The above-mentioned object is attained, according to the invention, with a method of control to determine the comfort level of a tire of a wheel for a vehicle, based on a dynamic tire model comprising i) a rigid ring that represents tread strip, belt pack and carcass of said tire, a disc that represents a rim of said wheel and beads of said tire, radial and tangential springs, distributed circumferentially, that connect said rigid ring to said disc and represent the sidewall of said tire and the air under pressure inside said tire, additional springs that represent residual stiffnesses that are depending on deformations present in the contact area between said tire and road, and a further spring in series with a damper that represent a brush model that simulates slipping phenomena in the contact area, ii) equations of the motion of said rigid-ring tire model in a longitudinal direction x and in a vertical direction z and in a rotary direction theta round a transversal axis y to obtain a transfer matrix between displacements and forces and to define transfer functions under different boundary conditions that allow the determination by calculation of the naturalmodes to vibrate of said tire, and iii) concentrated physical parameters of said model, that represent physical properties of said tire, derived from direct measurements on said tire of the following parameters:
mass of said rigid ring mb,
moment of inertia of said rigid ring Ib,
moment of inertia of said wheel and of said beads Ir,
torsional foundation stiffness Cbt,
slipping stiffness of the brush model Ckx, and
dynamic length of the contact area 2a, said method being characterized by the following steps:
a) determination of eight curves calculated depending on the forward speed of the wheel: four for the natural frequencies and four for the corresponding dampenings of said tire, b) determination of eight curves of natural frequencies and dampenings obtained by means of a model of analysis of the signals from test of passing over an obstacle, c) parametric identification of the following concentrated parameters of said model:
radial foundation stiffness Cb and corresponding dampening rb,
dampening rbt corresponding to a torsional foundation stiffness Cbt,
residual torsional stiffness of the contact area Cct and corresponding dampening rct,
residual radial stiffness of the contact area Ccz and corresponding dampening rcz,
residual longitudinal stiffness of the contact area Ccx,
said parametric identification being carried out by verifying the coincidence between said eight calculated curves and said eight curves of natural frequencies and dampenings obtained from said test of passing over an obstacle by means of a mathematical algorithm that, by modifying the values of the eight concentrated parameters of said model, allows to determine which are the values of said eight concentrated parameters that cause the calculated frequencies and dampenings to coincide with the experimental ones, d) comparison of the values of the concentrated parameters obtained in this way with ranges of values of dampenings and stiffnesses corresponding to pre-established indices of comfort, and e) approval of those tires wherein the concentrated parameters fall within preselected intervals.

Preferably, said intervals have the following values:
rb=100–300 (Ns/m)
rbt=2–40 (Nms/rad)
rcz=100–350 (Ns/m)
rct=10–90 (Nms/rad)
Ckx=18,000–70,000 (N).

With the method of control of tires according to the invention the experimental determination is carried out of the curves of natural frequencies and of the dampenings, related to four natural-modes that are of interest, against the forward speed. In this way account is taken of the variations of the physical properties of the tire (stiffnesses and dampenings) with the forward speed.

The dynamic tire model used allows the understanding and analysis of the vibratory phenomena, transmitted or generated by the tire, that influence the ride comfort of a vehicle in the range of frequencies from 0 to 130 Hz. The dynamic tire model can be used as an element of more complex dynamic systems, such as the model of a vehicle, for the study and simulation of ride comfort.

The optimization of the tire's design specifications is achieved through appropriate simulations of the complete model of vehicle/tire/road excitation. The parameters of the plane tire model are varied with a view to the optimization of the ride comfort of a vehicle (as indices of comfort on a vehicle, for example, it is possible to take the accelerations at the driver's seat). The tire model is physical and it thus allows the discrimination (identification) of the physical characteristics that optimize comfort. In particular, the dynamic tire model is a model with concentrated (overall) physical parameters: for example the radial stiffness of the sidewall is the overall value, and not the stiffness per unit of circumference; the same is said for the mass and the moment of inertia of the belt/carcass/tread strip pack, etc. Thus, once the particular concentrated physical parameter of the plane dynamic model has been optimized, the identification is made with a Finite Element model of those characteristics of the materials or geometric characteristics of the tire on which it is appropriate to act in order to obtain the particular overall physical parameter of the plane dynamic model.

The method of control of tires according to the invention is particularly advantageous in terms of costs, reliability, transparency of the results, quality and performances of the product.

BRIEF DESCRIPTION OF THE DRAWINGS

Features and advantages of the invention will now be illustrated with reference to an embodiment represented as a non-limiting example in the enclosed figures, wherein:

FIGS. 3 and 4 show the curves of natural frequencies and percentage dampenings, experimental and calculated, against the forward speed of the wheel, determined with the method according to the invention;

FIG. 10 shows a torsional pendulum for measuring the moment of inertia Ib of the tire;

FIG. 11 shows diagrammatically a dynamometric carriage for a braking test of the wheel;

DETAILED DESCRIPTION OF THE PREFERRED EMBODIMENTS

Figure 1:
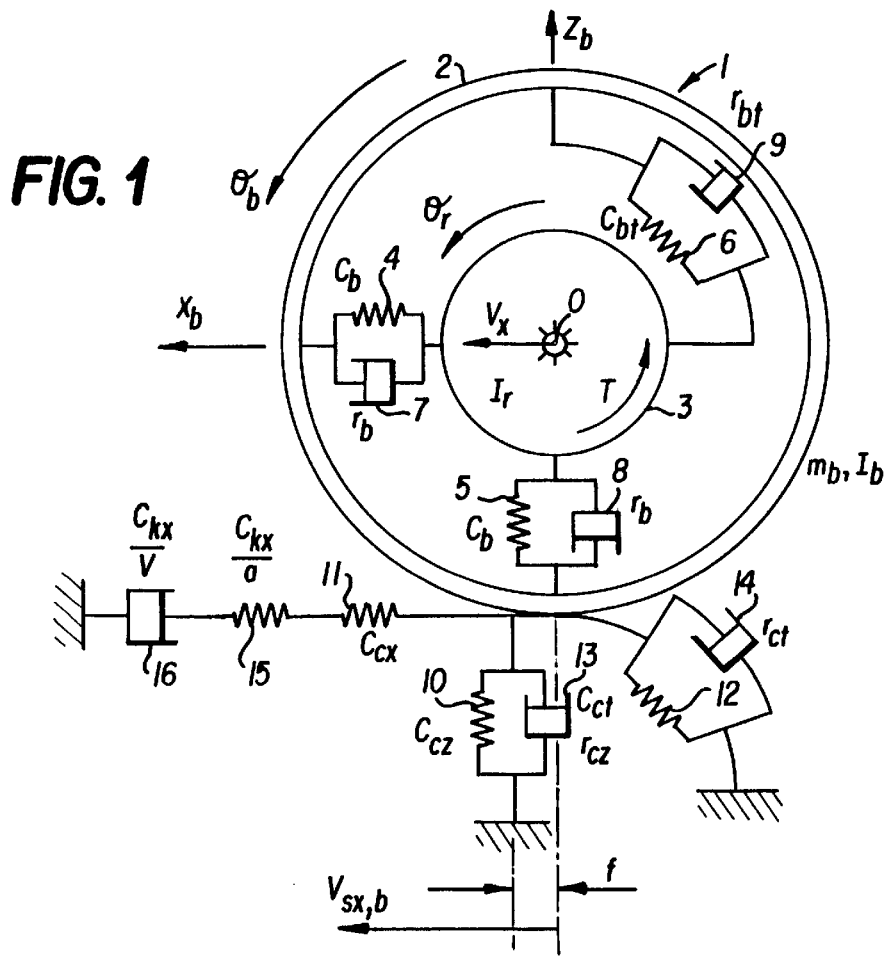
FIG. 1 shows a rigid-ring tire model used in a method of control of a tire of a wheel for a vehicle, made according to the invention.

There is shown in FIG. 1 a rigid-ring tire model, on which there is based a method of control of a tire of a wheel for a vehicle, made according to the invention The rigid-ring model is in a plane and it has (overall) concentrated parameters corresponding to those of the tire under examination. The tire model comprises a rigid ring 2 that represents tread strip, shoulders, belt structure and the corresponding of portion of carcass and has a mass $mb=2\pi R\rho A$ and moment of inertia $Ib=2\pi R^3\rho A$, where $\rho A$ is the mass per unit of length of the tread strip, shoulders, belt structure and corresponding portion of carcass and R is the average external radius of the tire. The tire model comprises a disc 3 that represents the rim of the wheel and the beads of the tire and has moment of inertia Ir consisting of the moment of inertia of rim and beads. The model comprises radial springs 4 and 5 and a tangential spring 6, interposed between ring 2 and disc 3 and distributed circumferentially, that represent the pneumatic stiffness of the sidewall and of the carcass, respectively, with the tire inflated, and have radial foundation stiffness $Cb=\pi rR[Cv+Cw]$ and torsional foundation stiffness $Cbt=2\pi R^3 Cv$, respectively, where Cv is the tangential stiffness per unit of length of the belt and Cw is the radial stiffness per unit of length of the belt. The model comprises radial dampers 7 and 8 and a tangential damper 9, interposed between ring 2 and disc 3, having, foundation dampenings rb and rbt that correspond to the foundation stiffnesses Cb and Cbt, respectively.

The model also comprises a vertical spring 10, a longitudinal spring 11 and a tangential spring 12 that simulate deformations present in the contact area between tire and road and have residual radial Ccz, longitudinal Ccx and torsional Cct stiffnesses, respectively. The model also comprises a vertical damper 13 and a tangential damper 14, having residual dampenings rcz and rct, respectively, corresponding to the residual stiffnesses Ccz and Cct. The model also comprises another longitudinal spring 15 and a longitudinal damper 16 that represent a "brush model" that simulates phenomena of slipping in the contact area. The brush model has a slipping stiffness $Ckx=2a^2 Cp$, where Cp is the stiffness of the tread per unit of length (function of the frequency) and 2a is the dynamic length of the contact area.

There are shown in FIG. 1 a vertical axis zb and a longitudinal axis xb having origin in O (trace of a transversal axis yb), an angle of rotation $\theta b$ of the ring 2, an angle of rotation $\theta r$ of the disc 3, a traction torque T, a camber f (distance of the center of the contact area from the axis zb), forward speed of the wheel Vx and slipping speed Vsx,b.

The equations of the motion of the rigid-ring model, obtained through dynamic equilibriums for small variations of the independent variables are the following:

$$mb\ \ddot{x}b+Cb\ xb+rb\ \dot{x}b+Fx=0$$

$$mb\ \ddot{z}b+(Cb+Ccz)zb+(rb+rcz)\dot{z}b-f\ Ccz\theta b-f\ rcz\theta b=0$$

$$Ib[|\$]\$"g\ddot{v}b+Cbt(\theta b-\theta r)+rbt\ (\dot{\theta}b-\dot{\theta}r)R\ Fx+f^2\ Ccz\theta b+rcz\theta b+ rct\theta b+Cct\theta b-f\ Ccz\ zb-f\ rcz\ \dot{z}b=0$$

$$Ir[|\$]\$"g\ddot{v}r+Cbt(\theta r-\theta b)+rbt(\dot{\theta}r-\dot{\theta}b)-T=0.$$

Once the tire model has been implemented, the concentrated parameters of the model corresponding to the tire under examination remain to be determined, as required. To do this, recourse is made to an original method consisting of a hybrid technique between direct measurements of some physical properties of the tire and the parametric identification of the remaining ones by means of mathematical methods, using an appropriate experimental dynamic test consisting of a fixed-hub test of passing over an obstacle on a road-wheel with tire, that will be described later.

The total number of parameters of the model to be determined is fourteen. They are mb; Ib; Ir; Cbt; Ckx (or Cp); a; Cb; rb; Cct; rct; rbt; Ccz; rcz; Ccx. Of these parameters, six are measured experimentally, in a manner that will be described in detail later. The measured parameters are: mb; Ib; Ir; Cbt; Ckx (or Cp); a (photograph of the contact area). The six parameters of the model measured experimentally are selected with great care; in particular those parameters have been selected whose measurement is not critical (such as the weight and the moment of inertia of the tire, the moment of inertia of the rim, etc.), or those parameters that do not vary with the forward speed of the tire (torsional stiffness), or those whose variation with speed is known (length of the contact area).

Thus, overall, eight parameters of the model remain to be determined, in particular: Cb; rb; Cct; rot; rbt; Ccz; rcz; Ccx. With the method according to the invention use is made of the results obtained from a fixed-hub test of passing over an obstacle, as will be described in detail later. Eight experimental figures are obtained from this test, consisting of the curves, versus the speed of the wheel, of the first four natural frequencies of the tire and of the corresponding dampenings. Eight calculated curves for the natural frequencies and corresponding dampenings of the rigid-ring model, can be derived from the above-listed equations of motion. Then, knowing these eight calculated curves and the eight experimental curves for natural frequencies and dampening allows the eight remaining parameters to be identified in a univocal manner by curve fitting techniques. Thus, only one experimental test is performed, with a considerable saving in time and costs over the dynamic model of P. W. A. Zegelaar et al. wherein the parameters are determined by means of modal analysis.

Figure 2:
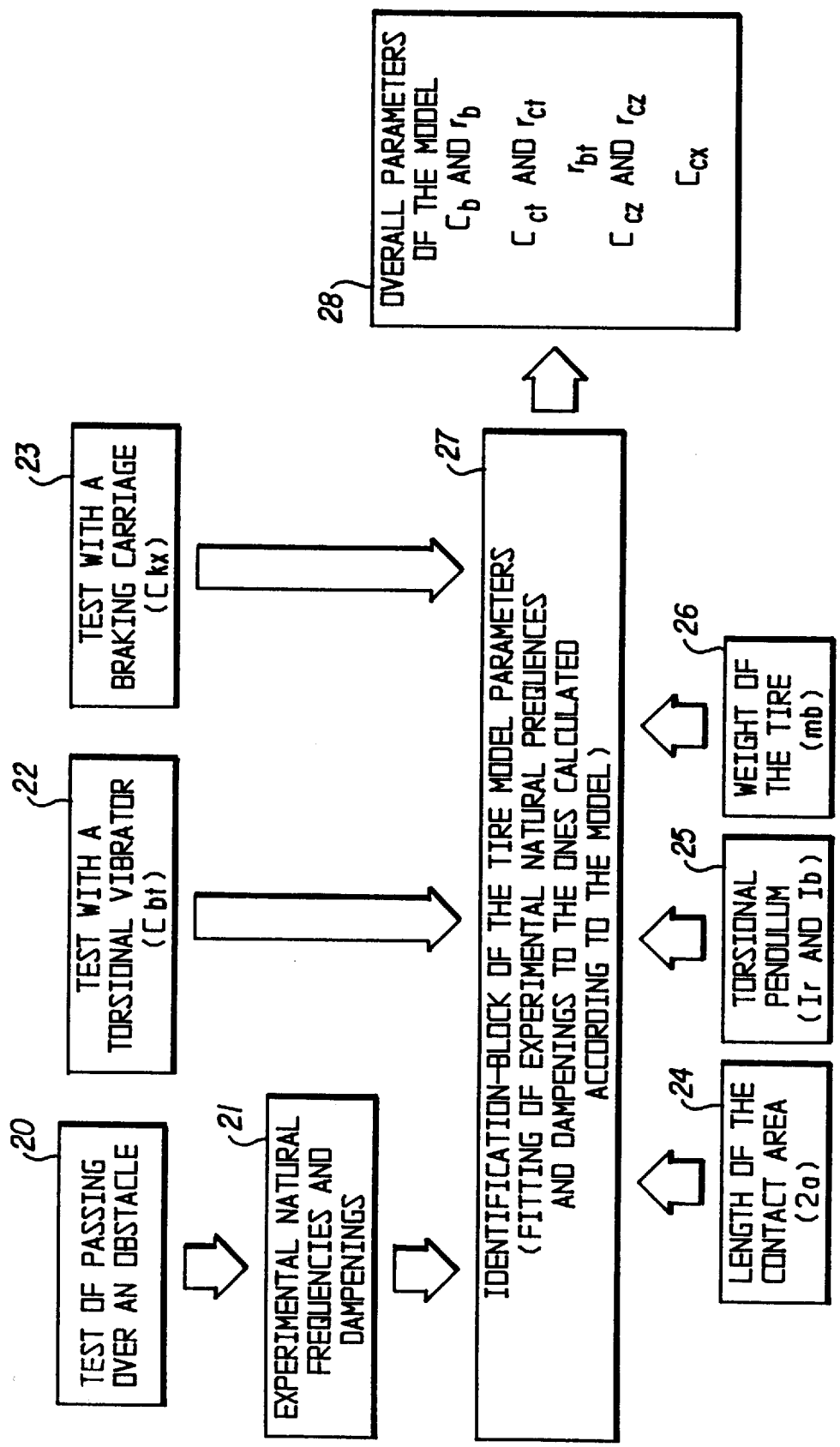
FIG. 2 is a flow diagram of the method of control made according to the invention.

There is shown in FIG. 2 a flow diagram of the method of control of the tire according to the invention.

Block 20 represents the fixed-hub test of passing over an obstacle from which experimental natural frequencies and dampenings of the tire under examination (block 21) are obtained. Block 22 represents a test with a torsional vibrator from which the torsional foundation stiffness Cbt is obtained. Block 23 represents a test with a braking carriage from which the slipping stiffness of the brush model Ckx is obtained. Block 24 represents an operation for measuring the length of the contact area 2a. Block 25 represents a test with a torsional pendulum from which the moment of inertia Ir of the rim and of the bead and the moment of inertia Ib of the tread strip, belt pack and carcass are obtained. Block 26 represents an operation for determining the weight of the tire from which the mass mb of the tread strip, shoulders, belt structure and the corresponding portion of carcass is obtained.

The experimental natural frequencies and dampenings and the measured parameters: Cbt, Ckx, 2a, Ir, Ib and mb are used in the above-listed equations of motion for an identification through calculation of the (overall) concentrated parameters of the dynamic tire model, represented by block 27. The (overall) concentrated parameters of the model: Cb; rb; Cct; rct; rbt; Ccz; rcz; Ccx (block 28) are obtained from the calculation.

In particular, the eight parameters of the model to be calculated consist of four stiffnesses (Cb, Cct, Ccz, Ccx) and four dampening coefficients (rb, rct, rbt, rcz). The dynamic tire model in the plane, described earlier, is capable of reproducing the four natural-modes of the tire in the plane of the wheel, that are exhibited in the range of frequencies 30–130 Hz, and that are also called "rigid modes". In other words, the model has four degrees of freedom that allow the four natural-modes of the tire taken into consideration to be studied: 1st mode 28–40 Hz; 2nd mode 75–100 Hz; 3rd mode 90–110 Hz; 4th mode 100–130 Hz. The model therefore provides through calculation the four natural frequencies and the four corresponding dampenings, that, naturally, are a function of the physical parameters of the model itself. By varying the eight concentrated parameters of the model indicated above, the natural frequencies and the dampenings change; it is therefore a case of identifying in a univocal manner the values of the remaining eight parameters of the model that make it possible for the calculated natural frequencies and the dampenings to be the same as those measured experimentally with the fixed-hub test of passing over an obstacle.

In practice, eight calculated curves are obtained from the model, depending on the forward speed of the wheel: four curves of the natural frequencies and four curves of the corresponding dampenings. In order to make these eight curves coincide with the eight experimental ones, conventional methods of calculation are applied such as, for example, a mathematical algorithm that by varying the eight parameters of the model in a suitable manner causes the calculated frequencies and dampenings to coincide with the experimental ones (FIGS. 3 and 4). Such an algorithm is nothing other than a solver of a system of eight equations (the eight curves of the experimental natural frequencies and of the dampenings) with eight unknowns (the concentrated parameters of the model). In other words the algorithm compares the experimental curves with the calculated ones and minimises the error, that is, the difference, by varying the parameters of the model as necessary. By employing the data points for the four natural frequencies and four corresponding dampenings into the respective eight equations, the eight equations are solved. Thus, the values of the parameters identified (calculated) in this way are univocal since a system of eight equations with eight unknowns has been constructed by the Applicant that admit of one and one only solution. Moreover, it should be highlighted that it is not possible for the four curves of the natural frequencies to be separated from those of the dampenings and thus to have two systems of four equations with four unknowns, because the eight equations (or curves) are interdependent one with the other.

The tests mentioned earlier will now be described in detail.

As said earlier, in order to determine natural frequencies and dampenings of the tire model the test of passing over an obstacle is performed. With this test, as opposed to the other tests wherein a parameter of the tire model was measured directly, a measurement is taken of the natural frequencies and of the dampenings of the tire in the vertical and in the longitudinal direction, that is, in the plane of the wheel, while these magnitudes do not appear explicitly in the model. As illustrated earlier, these measurements are fundamental for the identification, or for the calculation, of the eight remaining parameters of the model, that is, those that are not measured directly.

Figure 5:
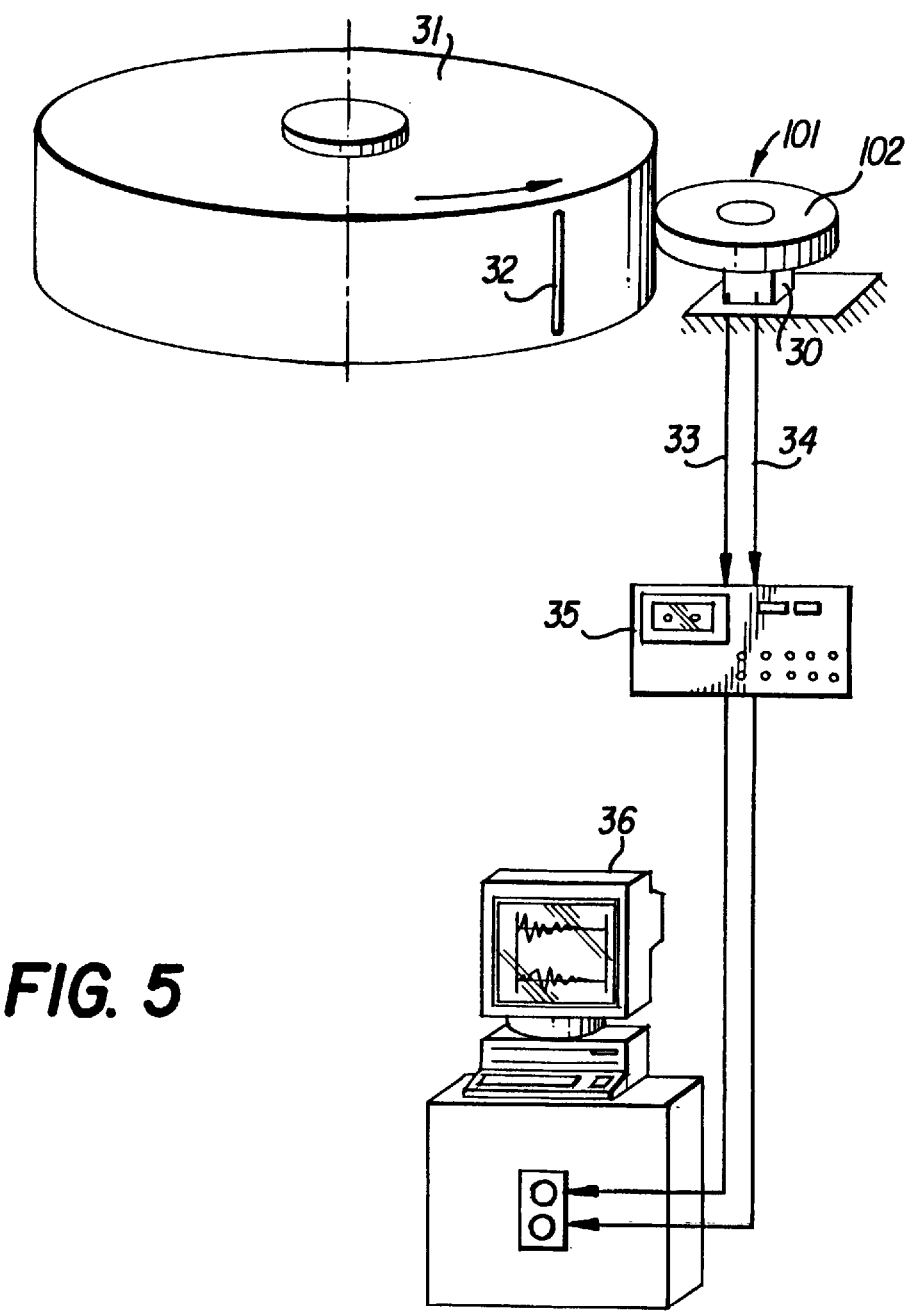
FIG. 5 shows diagrammatically an apparatus for a test of passing over an obstacle of a fixed-hub wheel.

The test of passing over an obstacle adopted is of the indoor type, with a fixed hub on a road-wheel. The test (FIG. 5) consists in mounting a wheel 101 on a dynamometric hub 30 and in squeezing it, with a load imposed perpendicularly to the axis of the wheel, against a road-wheel 31 that can rotate at predetermined speeds, supporting a relief 32 with a predetermined shape that constitutes the obstacle. The imposed load corresponds to the share of the weight of a vehicle bearing on a wheel.

The excitation to which a tire 102 is subjected, in the fixed-hub test, is the deformation imposed by the obstacle when the tire passes over it at a certain speed. The obstacle, depending on the forward speed of the wheel, excites the natural motions of the tire (excitation of the impulsive type), which starts to vibrate at its natural frequencies. After a more or less short time these vibrations are dampened. The methodology consists, then, in the analysis of the free dampened oscillations of the tire at different forward speeds. The signals 33 and 34 variable over time, read at the fixed hub 30, are those of the longitudinal and of the vertical force, that are depending on the excitation provided by the obstacle, to the forward speed of the wheel and to the natural frequencies of the tire in the plane of the wheel. The signals are read by a magnetic recorder 35 and by an acquisition and processing unit 36.

Four natural modes of the tire, known an "rigid" modes, are highlighted by the fixed-hub test of passing over an obstacle. During the test the signals of force, longitudinal and vertical, after the obstacle has abandoned the tire are analyzed over time, and the natural frequencies and the dampenings are identified with well-known techniques of analysis or mathematical models for signals of the impulsive type, such as, for example, the Prony or Ibrahim model. The final results are the curves of the natural frequencies and of the dampenings of the four vibration modes of the tire, that is, those modes ranging from 30 Hz to 130 Hz, against the forward speed. Thus, overall, there are eight experimental curves depending on the speed: four of the natural frequencies and four of the dampenings.

In some cases it is appropriate to highlight the natural modes of the wheel wherein the hub is free to oscillate in a vertical and in a longitudinal direction. Such natural modes are present in a motor car below 30 Hz (about 14 Hz in the vertical direction, about 20 Hz in the longitudinal direction).

In order to analyze the natural modes of the wheel between 0 and 30 Hz, recourse is made to test of passing over an obstacle with a hub that is movable (in the two directions mentioned above). An apparatus suitable for the purpose is described in the Italian patent application filed on the same date in the name of the same Applicant with the title "Apparatus for test of passing over an obstacle of a wheel comprising a rim and a tire".

The apparatus called "passive suspension", simulates in practice the motion of suspension of a wheel in a vehicle. The apparatus comprises suspension arms that rotatably support the wheel with the tire and are connected to a supporting chassis by means of leaf springs. The leaf springs have a stiffness that can be varied by varying the points at which they are connected to the chassis. In that way it is possible to vary the stiffness of the suspension in the vertical and in the longitudinal direction, so that the frequencies of the non-suspended masses of the "simulator" (passive suspension) coincide with those of the vehicle under examination.

Figure 6:
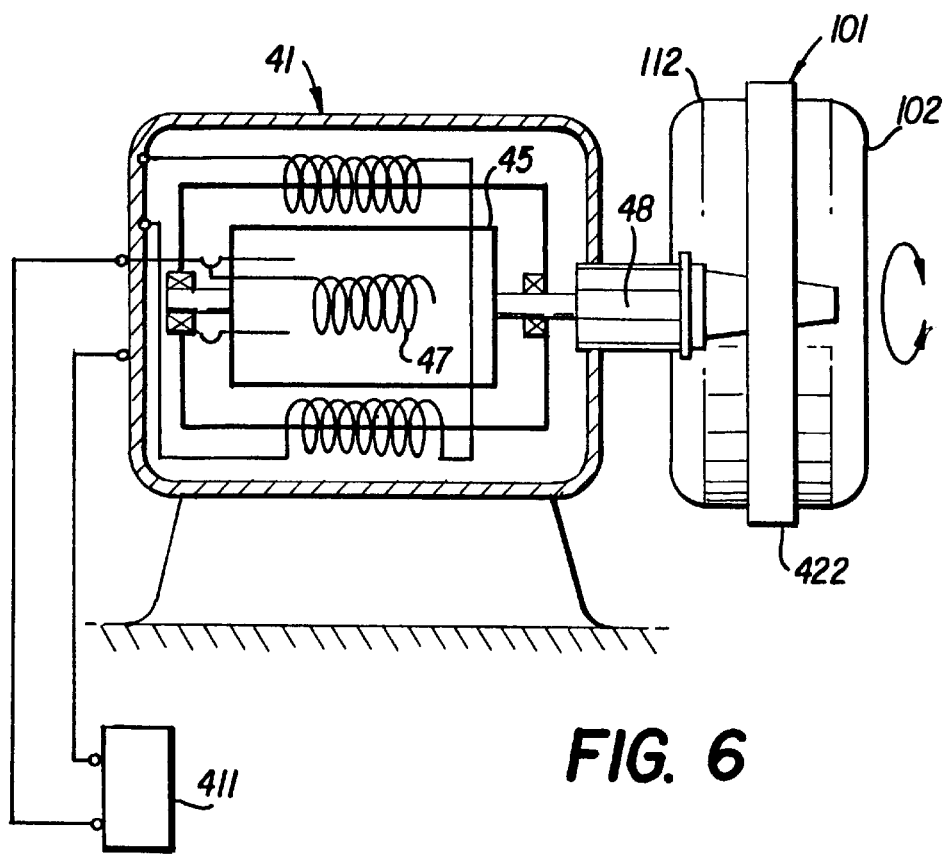
FIGS. 6 and 7 show a torsional vibrator used to measure the torsional foundation stiffness Cbt of the wheel in the method according to the invention.
Figure 7:
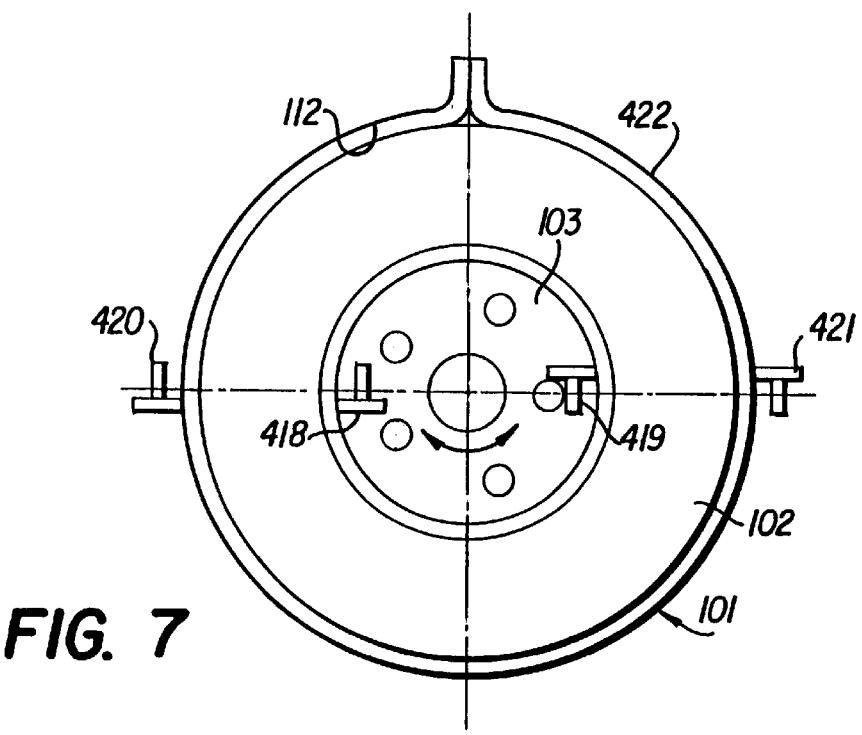

In order to measure the stiffness of the torsional foundation Cbt an electric torsional vibrator is used, shown in FIGS. 6 and 7, and described in an Italian patent application filed on the same date in the name of the same Applicant with the title "Torsional vibrator".

Such a vibrator consists of a direct-current electric motor 41 provided with a shaft 48 on which the wheel 101 (rim 103 plus tire 102) is keyed. The motor 41 comprises a rotor 45 with induced windings 47 supplied with direct current by inverter means 411 suitable for modifying the polarity of the induced windings 47 and, thus, of the induced magnetic field, in an alternating (sinusoidal) manner. In this way the shaft 48 starts to oscillate, thus causing the wheel 101 to vibrate in the rotational direction.

In particular, the frequencies at which the shaft 48 and, thus, the wheel 101 vibrates are linked to the frequencies of inversion of the magnetic field. In this way we have an electric rotational vibrator that allows the tire to be excited torsionally in the desired range of frequencies.

Figure 8:
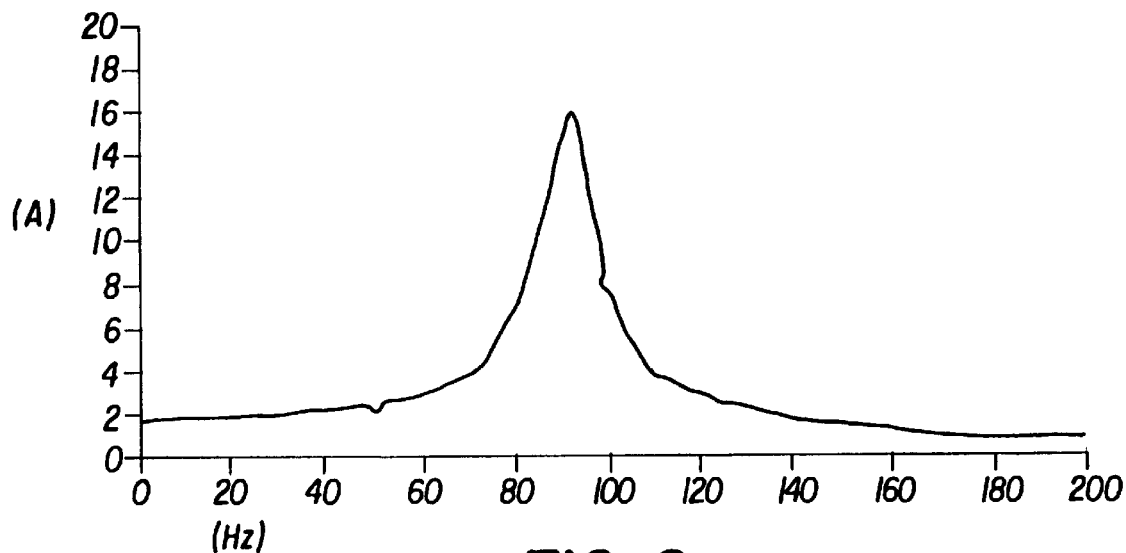
FIGS. 8 and 9 are graphs of a transfer function between the angular accelerations of a rim and of the tire of the wheel excited with the vibrator of FIGS. 6 and 7.
Figure 9:
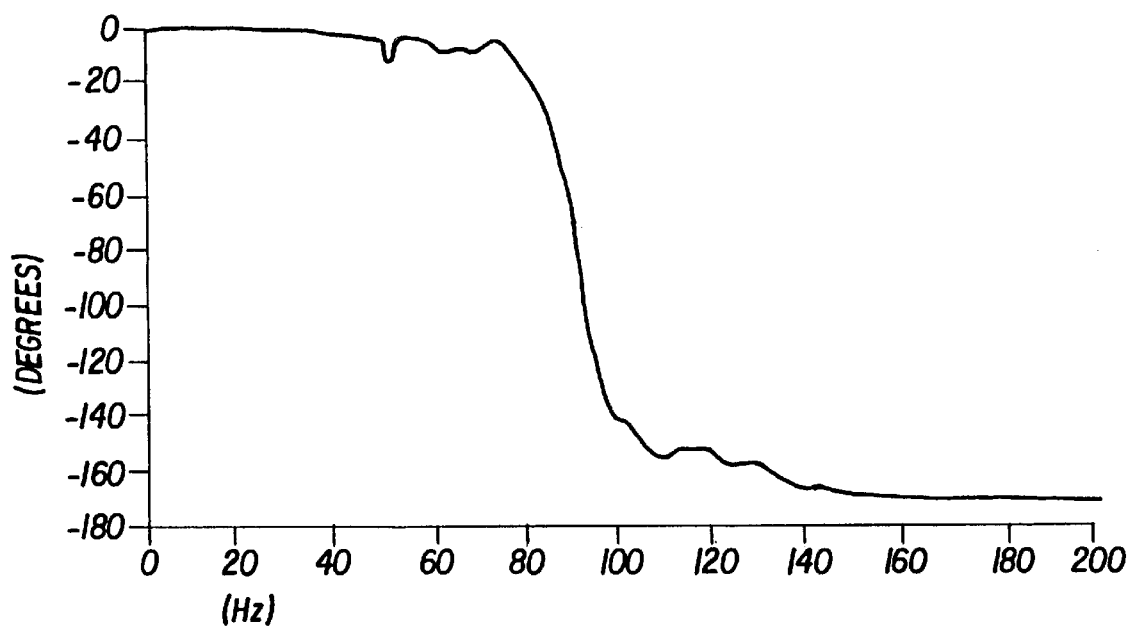

Measurement transducers 418, 419, 420 and 421 consisting of accelerometers are arranged on the rim 103 and on a metal band 422 tightly mounted on the tread 112 of the tire 102. The readings taken therefore are the angular acceleration of the rim 103 and that of the tire 102, that is, of the tread strip, shoulders, belt structure and corresponding portions of carcass. Calculating the ratio between the angular acceleration of the tire (taken as output) and that of the rim (taken as input), the transfer function is obtained as to amplitude and phase (depending on the frequency of excitation), as shown in FIGS. 8 and 9. Such transfer function (FIGS. 8 and 9) has a (maximum) resonance peak at the natural torsional frequency of the tire. If, then, the transfer function between the two accelerations as to amplitude and phase in the frequency range 0–200 Hz as well as the moment of inertia of the tire Ib (measured with a torsional pendulum, as will be illustrated later) are known, it is possible to calculate mathematically, by applying the formulas of the dynamic systems with one degree of freedom, the torsional foundation stiffness Cbt of the tire (stiffness between the tread strip, shoulders, belt structure, corresponding portion of carcass and rim).

The measurement of the torsional stiffness carried out with the torsional vibrator designed by the Applicant is of the dynamic type (frequency response of the tire) while that given in the article by P. W. A. Zegelaar et al. is substantially different, probably because it is static. In other words, given a static torque at the rim of the wheel, with the tire constrained inside a "circular form", the angle of rotation of the rim itself is read.

In order to measure the moment of inertia of the tire Ib, a torsional pendulum (FIG. 10) is used consisting of a helical spring 50 hung at one end from a steel beam 51 and connected at the other end to a hub 105 fastened to the rim 103 on which the tire 102 of the wheel 101 is mounted. The test consists in perturbing the pendulum from its condition of equilibrium, giving an initial rotation to the wheel 101, and in allowing it to oscillate freely. As is known, the pendulum oscillates at a frequency that is the natural one of the system (wheel 101 plus helical spring 50); if the period of oscillation is then measured (with a chronometer or an analyser) and knowing the stiffness of the helical spring 50, it is possible to determine the moment of inertia of the wheel 101 (rim 103 plus tire 102). The moment of inertia of the tire Ib is determined by difference: moment of inertia of the wheel 101 minus that of the rim Ir (including the hub 105) determined previously. It is seen that the moment of inertia of the tire Ib can be split, substantially, in a moment of inertia of the tread strip, shoulders, belt structure and corresponding portions of carcass and a moment of inertia of the beads. For the dynamic tire model described above and for the determination of the torsional foundation stiffness Cbt the moment of inertia of the tread strip, shoulders, belt structure and corresponding portions of the carcass is used.

In order to determine the overall slipping stiffness of the brush model Ckx a dynamometric carriage, also known as a "braking carriage", is used (FIG. 11).

A carriage 52, on which there is a mounted the wheel 101 comprising the tire 102 under test, is moved by a vehicle 53, from which the braking action on the carriage 52 is operated, along a very smooth track 54, made of marble tiles. On the wheel 101 there are mounted two load cells 55 for measuring the longitudinal force, that arises when a braking torque is applied to the wheel. On the same wheel there is also mounted a speed transducer 56, consisting of a phonic wheel, for measuring its angular speed. A well-known Peiseler wheel 57 is mounted on the carriage for measuring the forward speed of the carriage and a detector of the braking force 58. There is mounted on the vehicle an apparatus for the acquisition of signals of force and of slipping speed coming from the carriage 52, which are transmitted by telemetering means to a control tower. Apparatus and control tower are not shown, as they are known.

Figure 12:
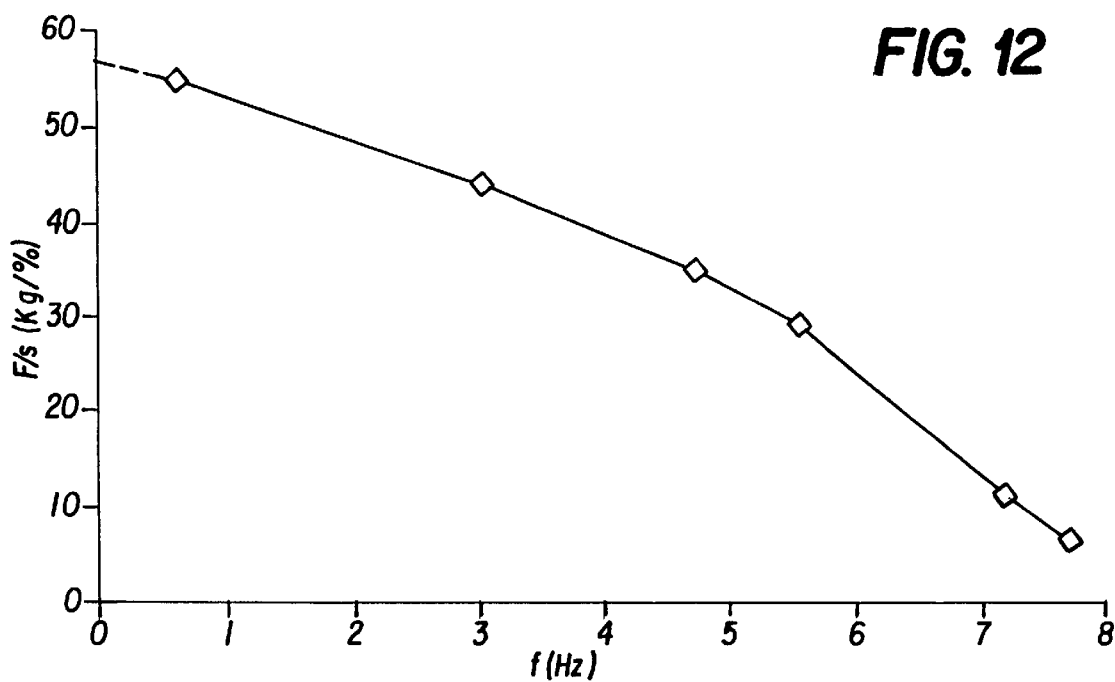
FIG. 12 is a graph that shows the curve of a transfer function between longitudinal force and slipping speed against frequency, observed on the wheel subjected to a braking test with the dynamometric carriage of FIG. 11.

The test consists in applying to the wheel 101 a "random" braking torque (so as to have the widest possible frequency content and to take into account the fact that the longitudinal stiffness varies with the frequency) and in determining the transfer function between the signals of longitudinal force at the hub of the wheel (output), and the slipping speed of the tire (input), meaning the difference between the forward speed of the carriage 52 and the peripheral speed of the tire 102. There is shown in FIG. 12 the curve of a transfer function F/s (kg/%) against the frequency (Hz). The limit, for a frequency tending to zero (dashed line in FIG. 12), of the transfer function between longitudinal force and slipping, is the total longitudinal stiffness Ckx of the tread under the contact area. The longitudinal stiffness per unit of length Cp of the tread is given by $Ckx/2a^2$.

The measurement takes into account the fact that this stiffness varies with frequency, as opposed to what is reported in the article by P. W. A. Zegelaar et al, where this fact is neglected.

Figures 13, 14:
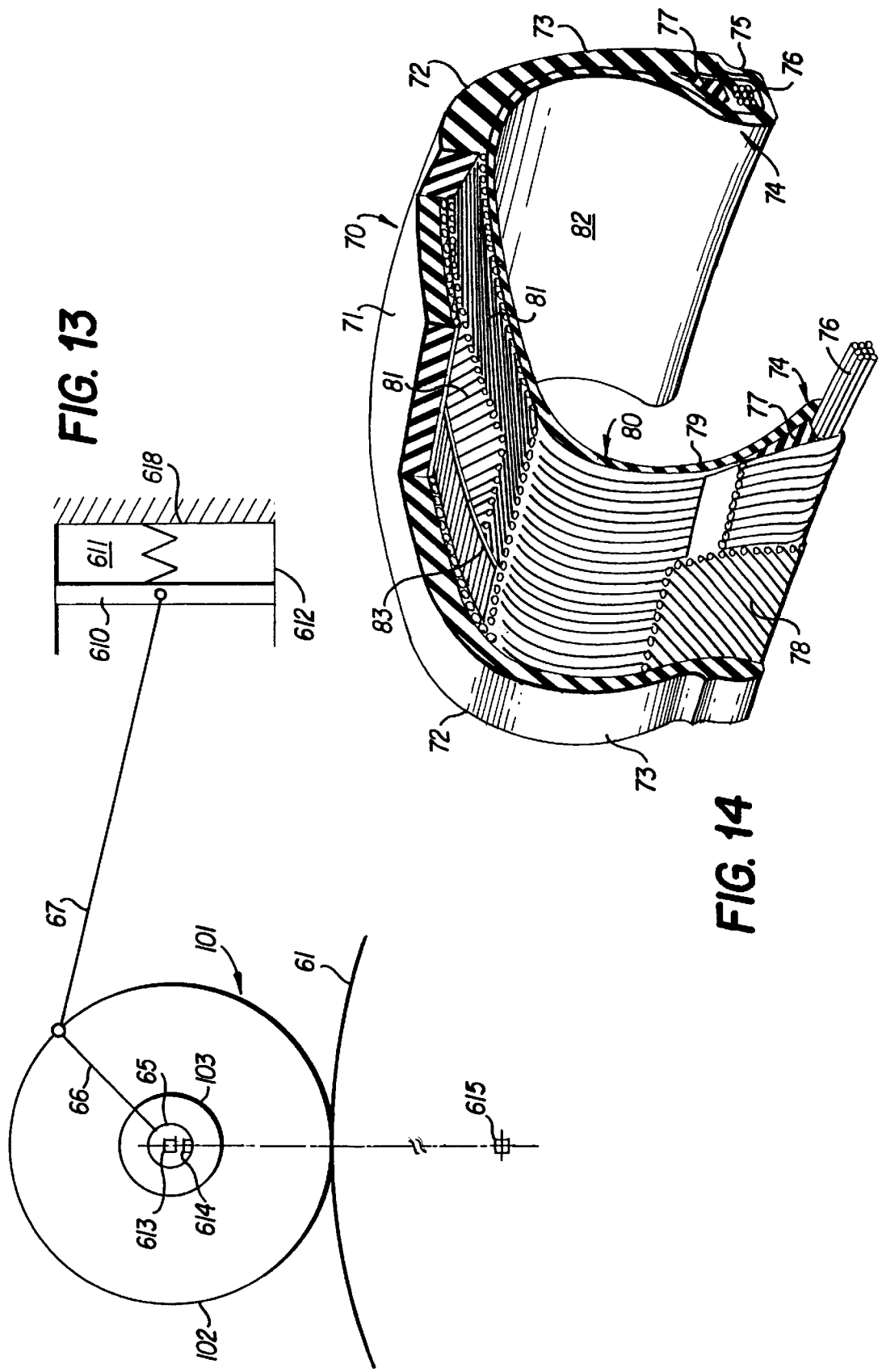
FIG. 13 shows diagrammatically a device for a braking test that can be used as an alternative to the dynamometric carriage of FIG. 11.
FIG. 14 is a partial view in perspective of a tire having construction characteristics determined with the method of control according to the invention.

A device for a braking test, to be used as an alternative to the above dynamometric carriage, is described in the Italian patent application filed on the same date in the name of the same Applicant with the title "Device for a braking and traction test of a wheel comprising a rim and a tire". With this device, the braking test, as opposed to that performed with the dynamometric carriage, is indoors, thus it can be run more easily and it has a level of accuracy that is higher in the measurement of the stiffness. In this case, as shown in FIG. 13, the wheel 101 with the tire 102, is mounted on a dynamometric hub 65 and is urged radially against a roadwheel 61; in turn, the rim 103 with the tire 102 is connected by means of a crank 66 and a connecting rod 67 to a compression chamber 611 (piston 610 plus cylinder 612 and head 618), with the purpose of having a driving and braking torque of a sinusoidal type on the wheel 101. With this device, the piston 610, during the compression stroke, provides, through connecting rod 67 and crank 66, a braking torque on the wheel of the tire; while during the expansion stroke, the torque provided on the tire is driving. The slipping of tire 102 is measured through two angular-speed transducers 615 and 613 on the road-wheel and on the rim 103 of the tire, respectively. The longitudinal force at the hub of the tire is read through a transducer 614 of the dynamometric hub 65.

The test consists in applying a sinusoidal torque of suitable amplitude with a frequency varying from 0.1 to 25 Hz and in determining the transfer function between the signals of longitudinal force at the hub of the wheel (output) and the slipping of the tire (input). In this indoor test, there is the advantage of a greater accuracy in measuring the value of the longitudinal force at low frequencies (0.1 Hz). The limit, for a frequency tending to zero, of the transfer function between longitudinal force and slipping, is the total longitudinal stiffness Ckx of the tread under the contact area. The longitudinal stiffness per unit of length Cp of the tread, is given by the ratio between total stiffness Ckx and the length of the contact area 2a. Since this stiffness is a function of the tread mixture, as well as of the design, it follows that the stiffness is a function of the frequency and this is taken into account in the "brush model" designed by the Applicant.

The measurement of the contact area 2a is made according to a known manner by photographing through a glass pane the passage of a tire mounted on a vehicle, so as to take into account the fact that the contact area of a tire varies with the forward speed (the reading taken with a stationary tire is appreciably less than that taken at speed). In particular, a television camera is placed inside a pit dug under the road and covered with a glass pane and through an acquisition system it is possible to obtain the contact area on the tire directly on a Personal Computer. The shot is made while causing a vehicle with the tire under examination to pass over the glass pane of the pit (a contrast liquid is placed between glass pane and tire), at different forward speeds.

After determining the concentrated parameters of the dynamic tire model, as described above, a comparison is made between the values of the concentrated parameters obtained in this way with ranges of values of dampenings and stiffnesses corresponding to pre-established indices of comfort and approval is reached for those tires wherein the concentrated parameters fall within the following intervals:

rb=100–300 (Ns/m)

rbt=2–40 (Nms/rad)

rcz=100–350 (Ns/m)

rct=10–90 (Nms/rad)

Ckx=18,000–70,000 (N).

The parameters of dampening and stiffness of the model mentioned above are influenced by the structural characteristics of the tire, in particular:

rb is influenced by the pneumatic dampening, that is by the air under pressure inside, and by the structural dampening of the sidewalls of the tire; it is not possible to do anything from a design viewpoint to the first dampening, while it is possible to do something to the second at the level of materials: mixture, rubber fabrics and geometry of the cross-section; for example, a more "upright " sidewall, that is, rectilinear, is more rigid and thus less dampened than a more rounded sidewall;

rbt is also influenced by the pneumatic dampening and by the structural dampening of the carcass of the tire; this dampening is linked to the materials: mixture, rubber fabrics and to the geometry of the cross-section of the tire; for example, a reduced-height tire is torsionally more rigid and, thus, less dampened than one that is not reduced;

rcz is a dampening in the vertical direction linked with the contact area of the tire; it is essentially influenced by the profile of equilibrium (transversal cross-section) of the tire;

rct is a dampening in the rotational direction linked mainly to the hysteresis of the mixture of the tread;

Ckx is the stiffness in the longitudinal direction of the contact area of the tire and it is, essentially, linked to the mixture and to the tread design.

Through the abovementioned dynamic tire model, four natural vibration modes of the tire are determined. In order to have a good comfort the curves of the percentage dampenings of the tire under examination are defined corresponding to the four vibration modes depending on the forward speed of the wheel.

The numerical intervals of the dampenings, related to the four natural frequencies, at the forward speeds are as follows:

| | PERCENTAGE DAMPENINGS | | | |
|---|---|---|---|---|
| SPEED kph | 1st Long. mode % | 1st Vert. mode % | 2nd Long. mode % | 3rd Long. mode % |
| 1. VERTICAL STATIC LOAD ON THE WHEEL: 200–450 Kg | | | | |
| 20 | 12–18 | 6–12 | 6–12 | 4–6 |
| 30 | 15–20 | 6–12 | 6–12 | 4–6 |
| 40 | 18–25 | 6–12 | 6–12 | 5–7 |
| 50 | 25–30 | 6–12 | 6–12 | 5–7 |
| 60 | 28–32 | 6–12 | 6–12 | 5–8 |
| 70 | 30–35 | 6–12 | 6–12 | 6–8 |
| 80 | 33–38 | 6–12 | 6–12 | 7–9 |
| 90 | 35–40 | 6–12 | 6–12 | 7–10 |
| 100 | 38–42 | 6–12 | 6–12 | 8–12 |
| 110 | 38–45 | 6–12 | 6–12 | 8–12 |
| 120 | 38–45 | 6–12 | 6–12 | 9–13 |
| 130 | 38–45 | 6–12 | 6–12 | 9–13 |
| 140 | 38–45 | 6–12 | 6–12 | 10–14 |
| 2. VERTICAL STATIC LOAD ON THE WHEEL: 450–650 Kg | | | | |
| 20 | 8–18 | 6–12 | 6–12 | 3–5 |
| 30 | 9–14 | 6–12 | 6–12 | 4–6 |
| 40 | 10–15 | 6–12 | 6–12 | 4–6 |
| 50 | 12–15 | 6–12 | 6–12 | 4–6 |
| 60 | 12–16 | 6–12 | 6–12 | 5–7 |
| 70 | 13–17 | 6–12 | 6–12 | 5–7 |
| 80 | 15–18 | 6–12 | 6–12 | 6–8 |
| 90 | 16–20 | 6–12 | 6–12 | 6–8 |
| 100 | 17–21 | 6–12 | 6–12 | 7–9 |
| 110 | 18–22 | 6–12 | 6–12 | 7–9 |
| 120 | 18–22 | 6–12 | 6–12 | 7–9 |
| 130 | 18–22 | 6–12 | 6–12 | 8–10 |
| 140 | 18–22 | 6–12 | 6–12 | 8–10 |

The percentage dampenings related to the four vibration modes of the tire depend essentially on the structural dampenings of the tire, represented physically in the model by concentrated dampers.

A tire 70 having construction characteristics determined with the method described above is shown in FIG. 14. The tire 70 comprises a tread strip 71, shoulders 72, sidewalls 73, beads 74 comprising bead wires 76 consisting of steel wires, bead fillers 77, an antiabrasive strip 75 and reinforcement edges 78, a carcass 80 comprising one or more plies rubber fabric 79 turned down over the bead wires 76, a belt structure comprising strips of rubber fabric 81 reinforced with cords crossed over one another in the two strips and arranged symmetrically with respect to the equatorial plane of the tire and a possible strip of rubber fabric 83 in a radially more external position, provided with cords oriented circumferentially, that is at 0°, and an internal liner, impermeable to air, 82.

In particular, in the tire 70, made in the size 225/55 ZR 16, the tread 71 is formed by a mixture having the following characteristics:

CA1 stiffness=1.6–2.4 Mpa
hardness (IRHD)=60–75
dynamic module E'=10–11.5 Mpa
loss module E"=5.5–7 Mpa
hysteresis delta tg=0.55–0.609.

The shoulders 72 are formed by a mixture having the following characteristics:
CA1 stiffness=1.2–1.8 Mpa
hardness (IRHD)=50–60
dynamic module E'=5–6 Mpa
loss module E"=0.8–1.2 Mpa
hysteresis delta tg=0.16–0.2.

The sidewalls 73 are formed by a mixture having the following characteristics:
CA1 stiffness=1.2–1.8 Mpa
hardness (IRHD)=50–60
dynamic module E'=5–6 Mpa
loss module E"=0.8–1.2 Mpa
hysteresis delta tg=0.16–0.2.

The antiabrasive strips 75 are formed by a mixture having the following characteristics:
CA1 stiffness=4–7 Mpa
hardness (IRHD)=75–98
dynamic module E'=13–16 Mpa
loss module E"=3–4.5 Mpa
hysteresis delta tg=0.31–0.281.

The bead fillers 77 are formed by a mixture having the following characteristics:
CA1 stiffness=5–7 Mpa
hardness (IRHD)=80–100
dynamic module E'=68–78 Mpa
loss module E"=14–19 Mpa
hysteresis delta tg=0.206–0.243.

The mixture of the rubber coating of the steel wires constituting the bead wires 76 has the following characteristics:
CA1 stiffness=7.5–10 Mpa
hardness (IRHD)=75–90
dynamic module E'=13.4–15 Mpa
loss module E"=3.4–4.5 Mpa
hysteresis delta tg=0.254–0.3.

The mixture of the rubber coating of the carcass plies 79 has the following characteristics:
CA1 stiffness=3.5–5 Mpa
hardness (IRHD)=75–90
dynamic module E'=8.0–9.5 Mpa
loss module E"=1.2–1.8 Mpa
hysteresis delta tg=0.15–0.189.

The cords of the carcass plies 79 are in rayon with a content of A/J 1842 arranged with a denseness F equal to 110–125 cords/dm.

The mixture of the rubber coating of the belt strips 81 has the following characteristics:
CA1 stiffness=4–5.5 Mpa
hardness (IRHD)=78–90
dynamic module E'=10–11.5 Mpa
loss module E"=1.7–2.5 Mpa
hysteresis delta tg=0.170–0.217;
while the cords are made of steel with a formation:
2+1×0.28 Denseness 7–90 cords/dm oriented according to an angle of 25°–28° with respect to the circumferential direction of the tire.

The mixture of the rubber coating of the zero-degree belt strip 83 has the following characteristics:
CA1 stiffness=3.5–5 Mpa
hardness (IRHD)=75–90
dynamic module E'=8.0–9.5 Mpa
loss module E"=1.2–1.8 Mpa
hysteresis delta tg=0.15–0.189;
while the reinforcing cords are made of Nylon spiralled in a circumferential direction, with a denseness equal to 105–120 cords/dm.

CA1 stiffness means the modulus of stiffness for 100% elongation.

The concentrated parameters of the above-mentioned tire measured under a vertical load of 277 kg have the following values:
$r_b$=250 (Ns/m)
$r_{bt}$=29 (Nms/rad)
$r_{cz}$=150 (Ns/m)
$r_{ct}$=70 (Nms/rad)
$C_{kx}$=25,000 (N) (taken at the frequency of 10 Hz)
$C_{kx}$=32,500 (N) (taken at the frequency of 100 Hz).

The same concentrated parameters of the above-mentioned tire, measured under a vertical load of 555 kg have the following values:
$r_b$=250 (Ns/m)
$r_{bt}$=29 (Nms/rad)
$r_{cz}$=160 (Ns/m)
$r_{ct}$=35 (Nms/rad)
$C_{kx}$=50,000 (N) (taken at the frequency of 10 Hz)
$C_{kx}$=65,000 (N) (taken at the frequency of 100 Hz).

We claim:

1. A method to determine the comfort level of a tire of a wheel for a vehicle, comprising:

A) simulating the tire by means of a dynamic rigid-ring tire model comprising a rigid ring that represents a tread strip, belt pack and carcass of said tire, a disc that represents a rim of said wheel and beads of said tire, radial and tangential springs, distributed circumferentially, that connect said rigid ring to said disc and represent the sidewall of said tire and the air under pressure inside said tire, additional springs that represent residual stiffnesses that are depending on deformations that are present in a contact area between said tire and a road, and a further spring in series with a damper that represent a brush model that simulates slipping phenomena in the contact area, wherein said tire model further comprises radial and tangential dampeners interposed between said ring and said disc and equations of motion define the motion of said rigid-ring tire model in a longitudinal direction (x) and in a vertical direction (z) and in a rotary direction (theta) round a transversal axis (y) based on concentrated physical parameters of the tire model comprising: mass of the rigid ring, which represents mass of tread strip, shoulders and belt structure of the tire ($m_b$), moment of inertia of the rigid ring, which represents moment of inertia of tread strip, shoulders and belt structure of the tire ($I_b$), moment of inertia of the disc, which represents moment of the inertia of the rim of the wheel and bead of the tire ($I_r$), brush model slipping stiffness of the springs ($C_{kx}$), dynamic length of the contact area (2a), and parameters of stiffness of the springs and dampeners of the dampeners of the model comprising:

radial foundation stiffness (Cb) and corresponding dampening (rb),
torsional foundation stiffness (Cbt) and corresponding dampening (rbt) residual torsional stiffness of the contact area (Cct) and corresponding dampening (rct),
residual radial stiffness of the contact area (Ccz) and corresponding dampening (rcz),
residual longitudinal stiffness of the contact area (Ccx) to obtain:
(i) a transfer matrix between displacements and forces, and,
(ii) transfer functions under different boundary conditions that allow for the determination by calculation of the natural modes of vibration of said tire, and
(iii) calculating, for four of the natural modes of the tire, four respective curves for calculated natural frequencies versus vehicle forward speed values and four curves for calculated dampenings corresponding to the respective natural frequency versus vehicle forward speed values;
B) directly measuring on said tire the following parameters:
mass of said rigid ring (mb),
moment of inertial of said rigid ring (Ib),
moment of inertia of said wheel and of said beads (Ir),
torsional foundation stiffness (Cbt),
slipping stiffness of the brush model (Ckx), and
dynamic length of the contact area (2a);
C) passing said tire over an obstacle to generate signals and analyzing the signals to obtain measure of the natural frequencies of the tire and corresponding dampenings, over a range of vehicle forward speeds and to determine eight curves: four of said curves for the measured natural frequencies of said tire versus the forward speed of the vehicle and four of said curves for the measured corresponding dampenings of said tire versus the forward speed of the vehicle;
D) identifying the following concentrated parameters of said model;
said radial foundation stiffness (Cb) and corresponding dampening (rb),
said dampening rbt corresponding to said torsional foundation stiffness (Cbt),
said residual torsional stiffness of the contact area (Cct) and corresponding dampening (rct),
said residual radial stiffness of the contact area (Ccz) and corresponding dampening (rcz),
said residual longitudinal stiffness of the contact area (Ccx),
said identifying comprising determining the values of the eight concentrated parameters of said model that cause the curves for the calculated natural frequencies and corresponding dampenings to coincide with the curves for measured natural frequencies and corresponding dampenings: and
E) comparing the values of at least some of the identified concentrated parameters with ranges of values of the at least some identified concentrated parameters corresponding to pre-established indices of comfort.

2. The method according to claim 1, wherein said ranges of values have the following values:
rb=100–300 (Ns/m)
rbt=2–40 (Nms/rad)
rcz=100–350 (Ns/m)
rct=10–90 (Nms/rad)
Ckx=18,000–70,000 (N).

3. The method according to claim 1, wherein the equations of motion comprise:

$$mb\ \ddot{x}b + Cb\ xb + rb\ \dot{x}b + Fx = 0$$

$$mb\ \ddot{z}b + (Cb+Ccz)zb + (rb+rcz)\dot{z}b - f\ Ccz\theta b - f\ rcz\dot{\theta} b = 0$$

$$Ib[\$]\$\ddot{g}\ddot{v}b + Cbt(\theta b-\theta r) + rbt(\dot{\theta}b-\dot{\theta}r) - R\ Fx + f^2 Ccz\theta b + f^2 rcz\dot{\theta}b + rct\dot{\theta} + Cct\theta b - f\ Ccz\ zb - f\ rcz\ \dot{z}b = 0$$

$$Ir[\$]\$\ddot{g}\ddot{v}r + Cbt(\theta r-\theta b) + rbt(\dot{\theta}r-\dot{\theta}b) - T = 0.$$

4. The method according to claim 1, wherein the measured natural frequencies are in the range of 30 to 130 Hz.

5. The method according to claim 1, wherein the concentrated parameters are identified by verifying the coincidence between eight curves calculated and measured for said four natural frequencies and four corresponding dampenings, respectively, by comparing curves of the four natural frequencies and four corresponding dampenings, measured while passing said tire over said obstacle, with the calculated curves, of the four natural frequencies and four corresponding dampenings, and varying the concentrated parameters to minimize the difference between the respective curves of measured four natural frequencies and four corresponding dampenings and curves of calculated four natural frequencies and four corresponding dampenings.

6. The method according to claim 1, further comprising, approving the tire if its concentrated parameters fall within the pre-established ranges.

7. A method to determine the comfort level of a tire of a wheel for a vehicle, comprising the following steps:
a) simulating the tire by means of a dynamic rigid-ring tire model, said model simulating the vibratory phenomena of the tire as a function of a plurality of parameters representing manufacturing characteristics of the tire itself;
b) defining within said plurality of parameters, concentrated physical parameters and concentrated parameters; said concentrated physical parameters representing one of the following characteristics: (i) measurements not critical, (ii) measurements not varying with the forward speed, and (iii) measurements varying with forward speed in a known way; said concentrated parameters representing measurements varying with forward speed and not directly measurable;
c) identifying from direct measurements on said tire the values corresponding to said concentrated physical parameters;
d) determining the vibrations of the tire as natural frequencies and dampenings by experimental measurements on said tire during a predefined test;
e) varying in a suitable manner the values of the concentrated parameters of said model until the frequencies and dampenings generated by the model, simulating tire vibrations, coincide with the frequencies and dampenings of the tire measured during said predefined test;
f) identifying the values of the concentrated parameters causing the frequencies and dampenings generated by the model to coincide with the frequencies and dampenings of the tire measured during said predefined test;
g) comparing the identified values of at least some of the plurality of parameters with ranges of predefined values corresponding to pre-established levels of comfort;

h) approving those tires wherein the concentrated parameters fall within preselected intervals.

8. A method as claimed in claim 7, wherein said predefined test comprises the test of passing over an obstacle.

9. A method as claimed in claim 7, wherein:

said rigid ring dynamic tire model comprises a rigid ring that represents tread strip, belt pack and carcass of said tire, a disc that represents a rim of said wheel and beads of said tire, radial and tangential springs, distributed circumferentially, that connect said rigid ring to said disc and represent the sidewall of said tire and the air under pressure inside said tire, additional springs that represent residual stiffness that are depending on deformations present in a contact area between said tire and a road, and a further spring in series with a damper that represent a brush model that simulates slipping phenomena in the contact area, said concentrated physical parameters of said model, comprises the following characteristics:
- mass of said rigid ring which represent mass of tread strip, sidewalls and belt structure (mb);
- moment of inertia of said rigid ring which represent moment of inertia of tread strip, sidewalls and belt structure (Ib);
- moment of inertia of said wheel and of said beads (Ir);
- torsional foundation stiffness (Cbt);
- brush model slipping stiffness (Ckx) and dynamic length of contact area (2a);

said concentrated parameters of said model, comprises the following characteristics:
- radial foundation stiffness (Cb) and corresponding dampening (rb);
- dampening (rbt) corresponding to a torsional foundation stiffness (Cbt);
- residual torsional stiffness of the contact area (Cct) and corresponding dampening (rct);
- residual radial stiffness of the contact area (Ccz) and corresponding dampening (rcz); and
- residual longitudinal stiffness of the contact area (Ccx).

10. The method according to claim 9, wherein said ranges of predefined values have the following values:

rb=100–300 (Ns/m)

rbt=2–40 (Nms/rad)

rcz=100–350 (Ns/m)

rct=10–90 (Nms/rad)

Ckx=18,000–70,000 (N).

11. A method as claimed in claim 9, wherein said predefined test comprises the test of passing over an obstacle.

* * * * *

UNITED STATES PATENT AND TRADEMARK OFFICE
CERTIFICATE OF CORRECTION

PATENT NO. : 5,811,672
DATED : September 22, 1998
INVENTOR(S) : Federico MANCOSU et al Page 1 of 2

It is certified that error appears in the above-identified patent and that said Letters Patent is hereby corrected as shown below:

Column 6, lines 1-5, replace the formula printed in the patent to the following:

$$-- m_b \ddot{x}_b + C_b x_b + r_b \dot{x}_b + F_x = 0$$
$$m_b \ddot{z}_b + (C_b + C_{cz}) z_b + (r_b + r_{cz}) \dot{z}_b - f C_{cz} \vartheta_b - f r_{cz} \dot{\vartheta}_b = 0$$
$$I_b \ddot{\vartheta}_b + C_{bt} (\vartheta_b - \vartheta_r) + r_{bt} (\dot{\vartheta}_b - \dot{\vartheta}_r) - R F_x + f^2 C_{cz} \vartheta_b + f^2 r_{cz} \dot{\vartheta}_b + r_{ct} \dot{\vartheta}_b + C_{ct} \vartheta_b - f C_{cz} z_b - f r_{cz} \dot{z}_b = 0$$
$$I_r \ddot{\vartheta}_r + C_{bt} (\vartheta_r - \vartheta_b) + r_{bt} (\dot{\vartheta}_r - \dot{\vartheta}_b) - T = 0. --$$

Claim 1, line 32, change "dampeners" (first instance) to read --dampenings--.

UNITED STATES PATENT AND TRADEMARK OFFICE
CERTIFICATE OF CORRECTION

PATENT NO. : 5,811,672
DATED : September 22, 1998
INVENTOR(S) : Federico MANCOSU et al It is certified that error appears in the above-identified patent and that said Letters Patent is hereby corrected as shown below:

Claim 3, lines 3-7, replace the formula printed in the patent to the following:

$$-- m_b \ddot{x}_b + C_b \dot{x}_b + r_b \dot{x}_b + F_x = 0$$

$$m_b \ddot{z}_b + (C_b + C_{cz}) \dot{z}_b + (r_b + r_{cz}) \dot{z}_b - f C_{cz} \theta_b - f r_{cz} \dot{\theta}_b = 0$$

$$I_b \ddot{\theta}_b + C_{bt} (\theta_b - \theta_r) + r_{bt} (\dot{\theta}_b - \dot{\theta}_r) - R F_x + f^2 C_{cz} \theta_b$$

$$+ f^2 r_{cz} \dot{\theta}_b + r_{ct} \dot{\theta}_b + C_{ct} \theta_b - f C_{cz} z_b - f r_{cz} \dot{z}_b = 0$$

$$I_r \ddot{\theta}_r + C_{bt} (\theta_r - \theta_b) + r_{bt} (\dot{\theta}_r - \dot{\theta}_b) - T = 0. --$$

Signed and Sealed this

Fourteenth Day of November, 2000

Q. TODD DICKINSON

*Attest:*

*Attesting Officer*    *Director of Patents and Trademarks*

UNITED STATES PATENT AND TRADEMARK OFFICE
CERTIFICATE OF CORRECTION

PATENT NO. : 5,811,672
DATED : September 22, 1998
INVENTOR(S) : Federico Mancosu et al Page 1 of 1

It is certified that error appears in the above-identified patent and that said Letters Patent is hereby corrected as shown below:

<u>Column 6</u>:
Lines 1-5, replace the formula printed in the patent to the following:

$$-- m_b \ddot{x}_b + C_b \dot{x}_b + r_b \dot{x}_b + F_x = 0$$
$$m_b \ddot{z}_b + (C_b + C_{cz}) \dot{z}_b + (r_b + r_{cz}) \dot{z}_b - f C_{cz}\vartheta_b - f r_{cz}\dot{\vartheta}_b = 0$$
$$I_b \ddot{\vartheta}_b + C_{bt}(\vartheta_b - \vartheta_r) + r_{bt}(\dot{\vartheta}_b - \dot{\vartheta}_r) - R F_x + f^2 C_{cz}\vartheta_b$$
$$+ f^2 r_{cz}\dot{\vartheta}_b + r_{ct}\dot{\vartheta}_b + C_{ct}\vartheta_b - f C_{cz} z_b - f r_{cz} \dot{z}_b = 0$$
$$I_r \ddot{\vartheta}_r + C_{bt}(\vartheta_r - \vartheta_b) + r_{bt}(\dot{\vartheta}_r - \dot{\vartheta}_b) - T = 0. --$$

Signed and Sealed this

Seventh Day of August, 2001

*Attest:*

NICHOLAS P. GODICI
*Attesting Officer*    *Acting Director of the United States Patent and Trademark Office*